United States Patent
Angoli et al.

(10) Patent No.: US 10,138,874 B2
(45) Date of Patent: Nov. 27, 2018

(54) SYSTEM FOR ENERGY PRODUCTION FROM RENEWABLE SOURCES

(71) Applicant: R.E.M. S.P.A. REVOLUTION ENERGY MAKER, Coccaglio (IT)

(72) Inventors: Roberto Angoli, Chiari (IT); Paolo Parma, Chiari (IT); Giancarlo Ghidesi, Asola (IT)

(73) Assignee: R.E.M. S.P.A. REVOLUTION ENERGY MAKER, Coccaglio (IT)

( * ) Notice: Subject to any disclaimer, the term of this patent is extended or adjusted under 35 U.S.C. 154(b) by 659 days.

(21) Appl. No.: 14/360,313

(22) PCT Filed: Nov. 26, 2012

(86) PCT No.: PCT/IB2012/002492
§ 371 (c)(1),
(2) Date: May 23, 2014

(87) PCT Pub. No.: WO2013/076573
PCT Pub. Date: May 30, 2013

(65) Prior Publication Data
US 2014/0327244 A1  Nov. 6, 2014

(30) Foreign Application Priority Data

Nov. 25, 2011 (IT) .............................. BG2011A0048

(51) Int. Cl.
*F03D 13/20* (2016.01)
*F03D 11/04* (2006.01)
(Continued)

(52) U.S. Cl.
CPC .............. *F03D 11/04* (2013.01); *F03D 3/005* (2013.01); *F03D 9/007* (2013.01); *F03D 9/25* (2016.05);
(Continued)

(58) Field of Classification Search
CPC .......... F03D 11/04; F03D 11/045; F03D 3/02; F03D 3/005; F03D 3/065; F03D 9/002;
(Continued)

(56) References Cited

U.S. PATENT DOCUMENTS 4,023,368 A * 5/1977 Kelly ...................... F03D 9/007
136/246
4,218,183 A * 8/1980 Dall-Winther .......... F03D 3/067
416/119

(Continued)

FOREIGN PATENT DOCUMENTS

DE 102010005585 A1 7/2011
WO 2010103378 A1 9/2010

*Primary Examiner* — David E Sosnowski
*Assistant Examiner* — Wayne A Lambert
(74) *Attorney, Agent, or Firm* — King & Schickli, PLLC

(57) ABSTRACT

A system for energy production from renewable sources comprising a support structure comprising a first and second pole (11) with a vertical axis wind generator (10) positioned on each of said poles; said first and second poles each comprising a connection element (29) positioned at their summit with a first seat for a first cable (24) and a second seat for a second cable (25); said first cable and said second cable being positioned mutually perpendicular; the ends of said first and second cables being fixed to the ground; said first and second poles (11) being each anchored to a post (12) fixed into the ground by means of a hinge (13); said wind generator (10) having a longitudinal central through hole to enable mounting on said pole and a lower and upper locking ring (9) associated with bearings (18) to enable said wind generator to rotate.

10 Claims, 5 Drawing Sheets

(51) Int. Cl.
*F03D 9/00* (2016.01)
*F03D 3/00* (2006.01)
*F03D 9/25* (2016.01)

(52) U.S. Cl.
CPC ........ *F03D 13/20* (2016.05); *F05B 2240/917* (2013.01); *F05B 2240/96* (2013.01); *Y02E 10/728* (2013.01); *Y02E 10/74* (2013.01)

(58) Field of Classification Search
CPC ................ F03D 9/007; F05B 2240/211; F05B 2240/96; F16M 13/00; F16M 11/00
USPC .......... 248/545, 530, 156, 127; 52/157, 165, 52/148
See application file for complete search history.

(56) References Cited

U.S. PATENT DOCUMENTS

| | | | |
|---|---|---|---|
| 4,224,082 A * | 9/1980 | Jacobson | F03D 9/007 126/646 |
| 4,486,143 A * | 12/1984 | McVey | F03D 3/0427 415/164 |
| 6,784,566 B2 | 8/2004 | Thomas | |
| 6,857,846 B2 * | 2/2005 | Miller | F03D 3/02 415/18 |
| 7,811,060 B2 | 10/2010 | Vanderhye | |
| 8,704,082 B2 * | 4/2014 | Angoli | F24J 2/5241 136/246 |
| 2002/0105190 A1 | 8/2002 | Thomas | |
| 2007/0212225 A1 | 9/2007 | Vanderhye | |
| 2009/0079197 A1 * | 3/2009 | Poo | F03D 3/02 290/55 |
| 2009/0097981 A1 * | 4/2009 | Gabrys | F03D 3/005 416/204 R |
| 2009/0261595 A1 * | 10/2009 | Poo | F03D 3/02 290/55 |
| 2010/0101988 A1 * | 4/2010 | Saeed | C02F 9/005 210/171 |
| 2010/0133846 A1 * | 6/2010 | Lin | F03D 3/061 290/55 |
| 2010/0158697 A1 | 6/2010 | Kim | |
| 2010/0219643 A1 * | 9/2010 | Biucchi | F03D 3/0409 290/55 |
| 2011/0006540 A1 * | 1/2011 | Ignatiev | F03D 9/00 290/55 |
| 2011/0025070 A1 * | 2/2011 | Price | F03D 3/005 290/55 |
| 2011/0089698 A1 * | 4/2011 | Ahmadi | F03D 9/007 290/55 |

* cited by examiner

SYSTEM FOR ENERGY PRODUCTION FROM RENEWABLE SOURCES

The present invention relates to a system for energy production from renewable sources.

Commonly considered to be renewable energy sources are hydroelectric, solar, wind, marine and geothermal energy, i.e. those sources the current use of which does not prejudice their future availability.

Those most commonly used are solar energy and wind energy.

A photovoltaic plant is an electrical system which utilizes solar energy to produce electrical energy by photovoltaic effect.

A solar follower is an electronically controlled mechanical device which favourably orientates a photovoltaic panel, a thermal solar panel or a solar concentrator relative to the sun's rays.

A wind plant converts the kinetic energy of the wind into electrical energy by the use of a turbine of vertical or horizontal axis.

To achieve a worthwhile electrical energy production, the aforesaid plants have to be of considerable dimensions. This implies robust supports and a very large base as the system must be able to withstand adverse climatic conditions and in particular must withstand wind force. The result is an enormous structure weight, a considerable base size, and installation requiring time and specialized labour.

Moreover, if such plants are positioned on an agricultural surface, considerable constraints are imposed on working the land, resulting in disturbance and hindrance to such work.

The document WO2010103378 describes a solar energy captation system supported by a network of ties.

An object of the present invention is to provide a system for energy production from renewable sources which enables total accessibility of the underlying land.

Another object is to provide a system for energy production from renewable sources which has an easily constructed support structure.

Another object is to provide a system which is simple to install and remove.

A further object is to provide a modular structure.

These and further objects are attained according to the invention by a system for energy production from renewable sources comprising a support structure comprising a first pole and a second pole which are positioned vertically; a wind generator of vertical axis positioned on said first pole and a wind generator of vertical axis positioned on said second pole; said first pole and said second pole each comprising a connection element positioned at their summit; said connection element comprising a lower portion to be fixed to said first pole and to said second pole; said connection element comprising an intermediate portion and an upper portion; a first seat for a first cable being positioned between said lower portion and said intermediate portion; a second seat for a second cable being positioned between said intermediate portion and said upper portion; said first cable and said second cable being positioned mutually perpendicular; the ends of said first cable and of said second cable being fixed to the ground by posts fixed into the ground; said first pole and said second pole being each anchored by means of a hinge to a post fixed into the ground; said wind generator having a longitudinal central through hole to enable mounting on said first pole and on said second pole; said wind generator comprising a lower first locking ring for said wind generator, and an upper second locking ring for said wind generator; a respective bearing being associated with said first ring and with said second ring to enable said wind generator to rotate.

Further characteristics of the invention are described in the dependent claims.

With the present invention, large plants can be built on agricultural surfaces while maintaining the ground suitable for its primary cultivation purpose.

In this respect, the generators are able to be positioned at a certain height from the ground without however using demanding load-bearing structures. The solution uses very thin poles of about 5-6 m high, maintained in position by ties. The foundations to which the poles and ties are coupled are reduced to concrete posts, leaving the greatest space possible for crops.

In this manner rows of posts are formed on the ground having a passage gap of about 4.5 m. This guarantees total access to the underlying land for circulation of agricultural vehicles or, if this structure is constructed on roads, perfect passage for vehicles using the road.

The wind generators are normally fixed to the ground individually, pole by pole. In contrast, the Applicant has realized that by using a common fixing system for several poles, this could be lighter and avoid the necessary large foundations which disturb the underlying agricultural crops.

In addition, in an advantageous embodiment, the structure of a solar plant is also synergically utilized to locate the wind generators.

The characteristics and advantages of the present invention will be apparent from the ensuing detailed description of one embodiment thereof, illustrated by way of non-limiting example in the accompanying drawings, in which.

Figure 1:
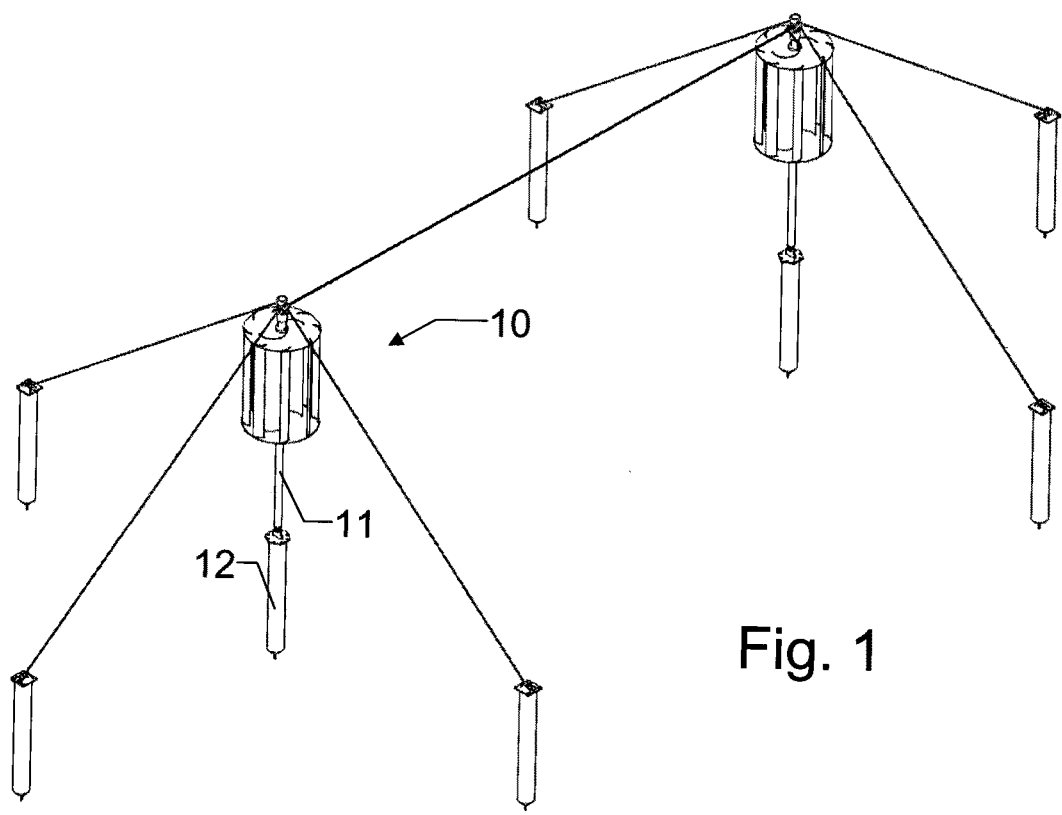
FIG. 1 shows a system for energy production from renewable sources with two elements, in accordance with the present invention.
Figure 2:
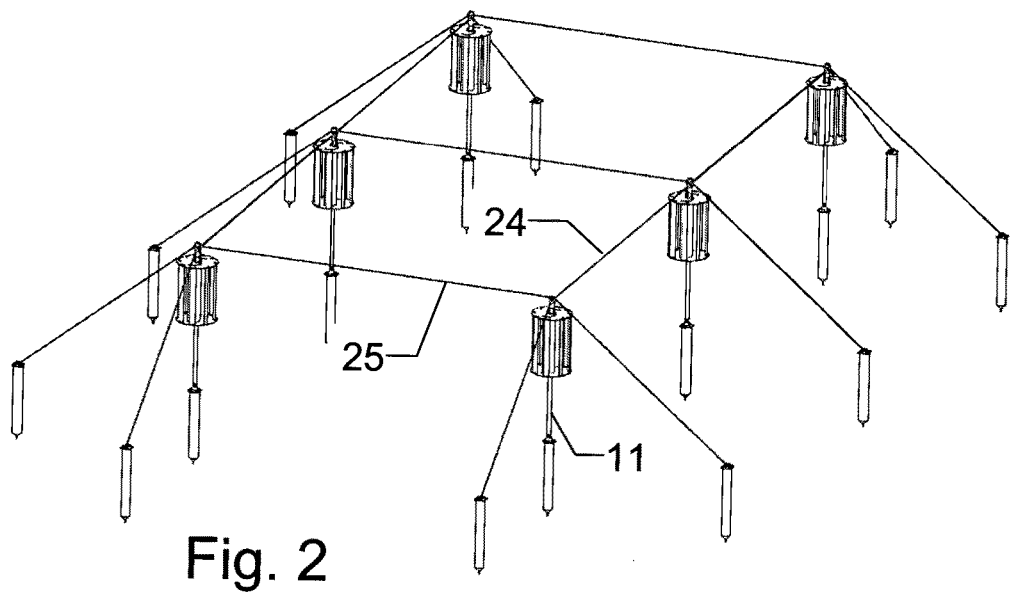
FIG. 2 shows a system for energy production from renewable sources with two elements, in accordance with the present invention.
Figure 3:
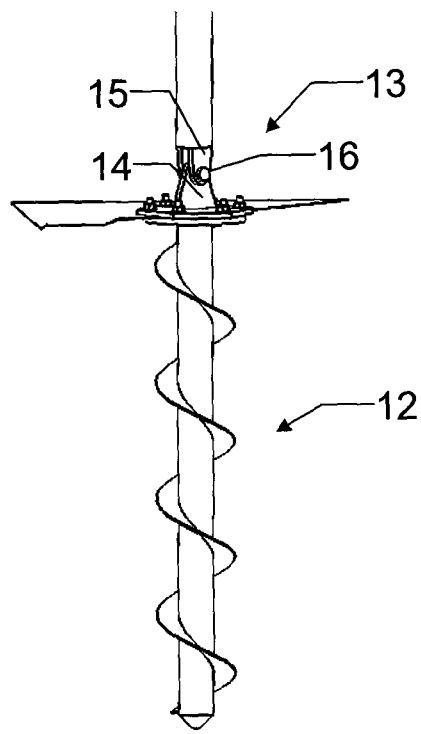
FIG. 3 shows a structure for fixing the support poles and ties to the ground, in accordance with the present invention.
Figure 4:
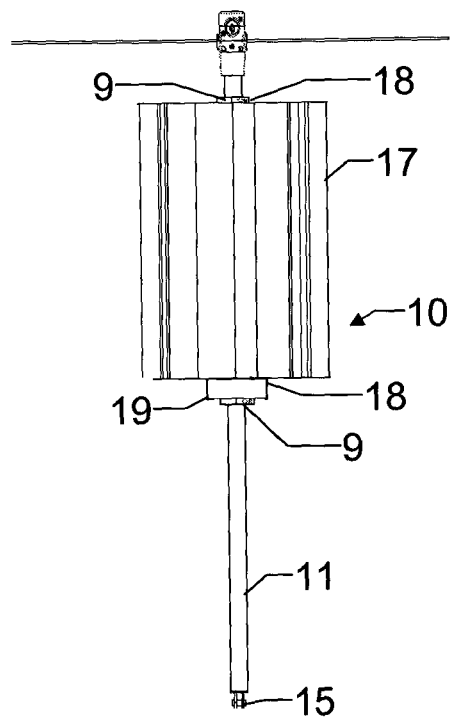
FIG. 4 shows a front view of a wind generator mounted on a support pole, in accordance with the present invention.
Figure 5:
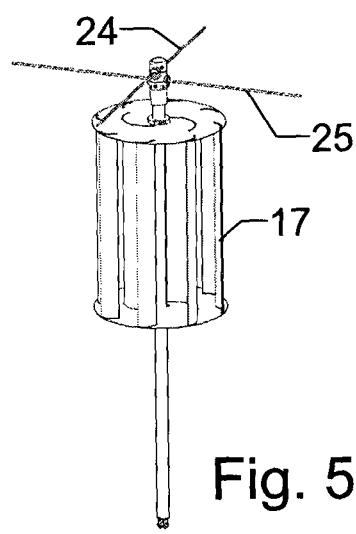
FIG. 5 shows a perspective view of a wind generator mounted on a support pole, in accordance with the present invention.
Figure 6:
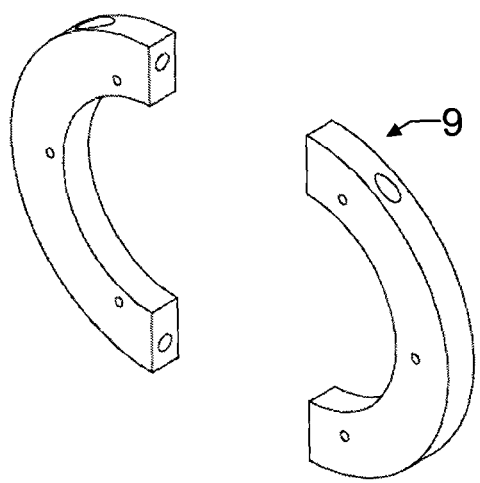
FIG. 6 shows the half-flanges of the wind generator, in accordance with the present invention.
Figure 7:
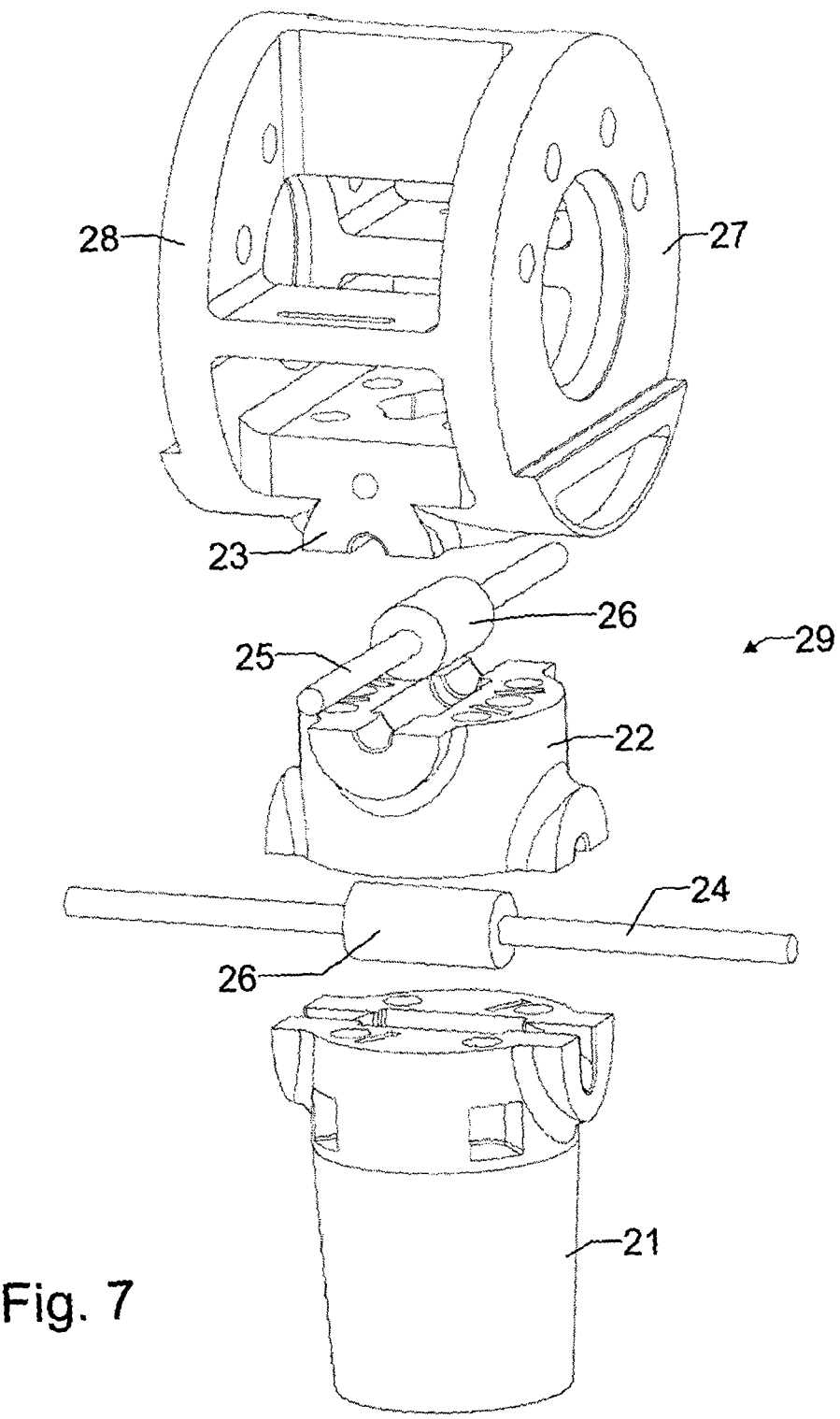
FIG. 7 shows an exploded view of a detail of the cable connection system of the system in accordance with the present invention.
Figure 8:
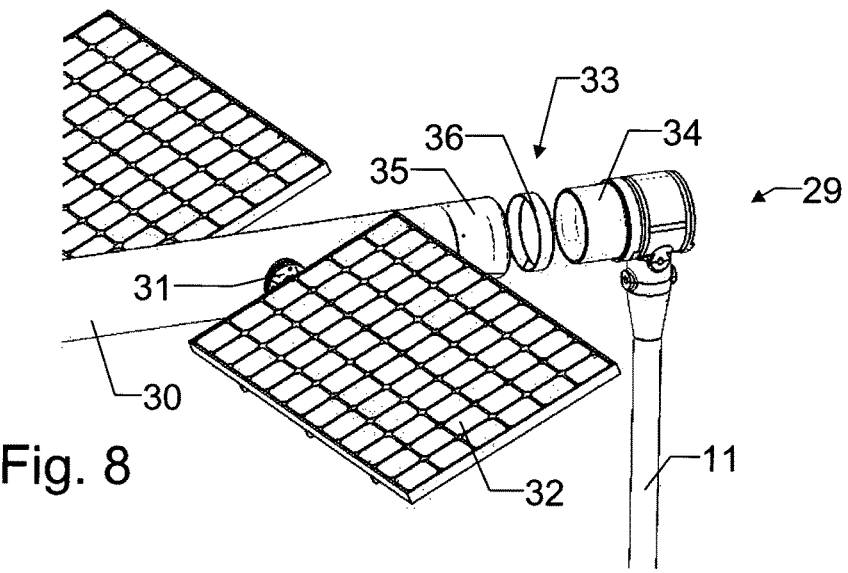
FIG. 8 shows an exploded view of a detail of the slidable expansion joint of the system in accordance with the present invention.
Figure 9:
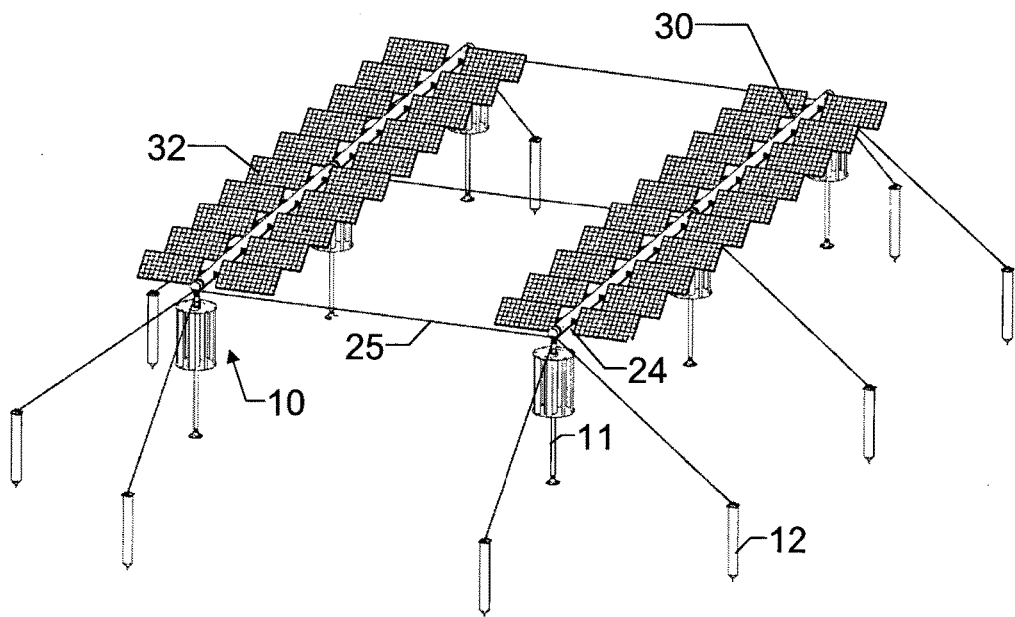
FIG. 9 shows a combined wind and solar energy production system.
Figure 10:
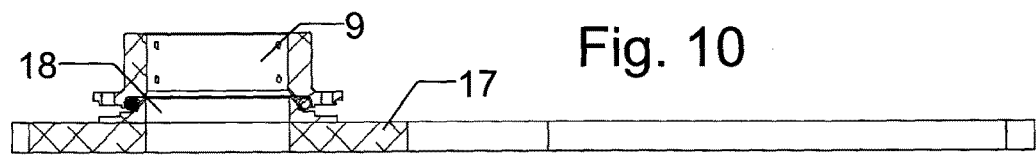
FIG. 10 shows a section through the turbine fixing system.
Figure 11:
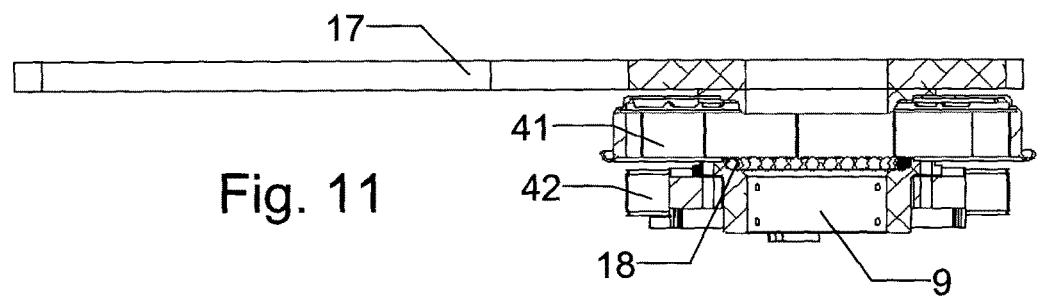
FIG. 11 shows a section through the turbine fixing system, including the electrical generator.
Figure 12:
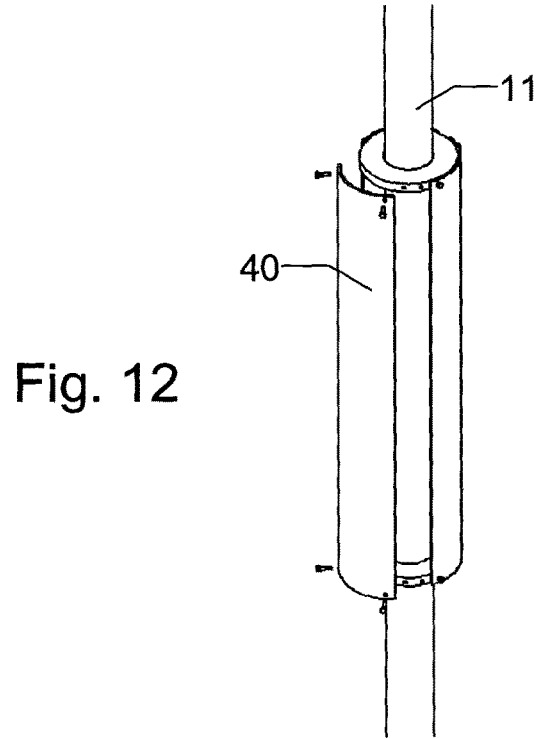
FIG. 12 shows the system for fixing the wind poles to the support pole.

With reference to the accompanying figures, a system for energy production from renewable sources in accordance with the present invention comprises a plurality of wind generators 10, in particular of vertical axis, supported by a tensostructure.

Each wind generator 10 is supported by an iron support pole 11 of diameter about 10-12 cm, having a thickness of 3-4 mm.

The support poles 11 are maintained in position by a network of ties.

The support poles 11 and the ties are fixed into the ground preferably by posts 12 laid in the ground. The posts 12 consist of a concrete tube of length 2-3 m and diameter of about 30 cm driven into the ground.

The support poles 11 are fixed to the posts 12 by a coupling point 13 positioned at their base.

The foundation advantageously consists of a post 12 driven into the ground or of a micro-pile formed on site, i.e. substantially a plug of concrete formed at a certain depth in the ground.

The post 12 is provided at its top with a coupling point 13, comprising a drilled vertical plate 14. The support poles 11 terminate at their base preferably with two spaced-apart drilled vertical plates 15 cooperating with the plate 14. The plate 14 is inserted into the plate 15.

A pin 16 is inserted through the mutually facing holes of the plates 14 and 15 to enable the support poles 11 to rotate about an axis parallel to the axis of the support pole 11. The coupling point 13 hence forms a hinge.

Each wind generator 10 comprises a turbine 17 of vertical axis, for example of Savonius type, positioned coaxially to the support pole 11. The turbine 17 is for example 2 m tall and has a diameter of 1 m.

The turbine 17 has a central longitudinal through hole for mounting on the support pole 11.

At one end it also comprises an electrical generator 19. For fixing the turbine 17 to the support pole 11 two half-flanges 9 are used, screwed thereto, namely one upper and one lower, which fix the turbine 17 to the pole 11. Each pair of half-flanges 9 acts as a support for a bearing 18, which enables the turbine 17 to rotate. Preferably, three or four structures 40 are fixed to said bearings 18 to define and maintain in position those wind-struck surfaces forming the wind blade. These flexible surfaces are maintained in shape by tensioning.

Said tensioning is achieved by modifying the distance between the opposing said support structures for the blade surfaces, the upper with respect to the first central and the second central with respect to the lower, in order. Tensioning is applied by adjusting appropriate screws inserted into the central ring.

Each pair of half-flanges 9 creates a ring of diameter slightly greater than the external diameter of the support pole, fixed by at least three equidistant radial screws, which enable the rings to be coupled to the pole and enable any non-linearity of the pole to be compensated. This enables poles to be used which are not necessarily perfectly linear and hence avoid costly pole machining to ensure their linearity within particular tolerances.

The rings fixed in this manner enable coaxial fixing points to be obtained independently of the linearity of the support pole, within certain limits.

Assembly of these rings is simplified by a simple removable support structure fixed externally to the rings which maintains them coaxial during the tightening of the screws fixing the rings to the pole.

The turbine 17 comprises the electrical generator 19 of toroidal type mounted directly on the pole 11, in proximity to the upper or lower rings 9. In particular, permanent magnets 41 are fixed to the bearing 18 to induce, following rotation of the blade, an electrical field within the windings 42 of a stator connected to the corresponding ring 9, to form overall a polyphase ring generator.

A fixing element (or connection crown) 29 is fixed to the upper end of the support poles 11.

The fixing element 29 presents a lower portion 21 for its fixing to the poles 11, an intermediate portion 22 and an upper portion 23.

A seat is provided for a cable 24 between the lower portion 21 and the intermediate portion 22.

Between the intermediate portion 22 and the upper portion a seat is provided for a cable 25 disposed perpendicular to the cable 24.

Hence the fixing element 29 is formed such as to enable it to be mounted on the top of the pole 11 and be traversed by the two mutually perpendicular taut metal cables 24 and 25.

Essentially, the two taut metal cables 24 and 25 are incorporated into the constituent components of the fixing element 29.

The portions 21, 22 and 23 are joined together by screws. Previously, locking sleeves 26 (which increase the cable diameter) are applied to the cables and crimped thereon in the factory at predetermined distances with great precision, in accordance with the dimensioning scheduled by the design. In this manner these sleeves form a sort of assembly template as the position of the sleeves already defines the distance between the support tubes 11 with great precision.

The seats for the cables 24 and 25 positioned in the lower portion 21, in the intermediate portion 22 and in the upper portion 23 are formed such as to be able to retain the locking sleeves 26.

Hence the cable is used not only to support the poles in position but also to hold them in position at the correct distances apart with great precision, so avoiding any adjustment of the distance between the tops of the poles. This system reduces costs, simplifies assembly of the support poles and ensures high precision.

Two mutually perpendicular cables 24 and 25 arrive at each pole 11. If dealing with a lateral pole, a cable is fixed to the ground at a post 12. If dealing with intermediate poles, the cable proceeds to the next pole.

For a plant with six poles 11, steel cables of 18 mm diameter are used.

In a particularly advantageous embodiment of the present invention, above the upper portion 23 of the fixing element 29 and lateral thereto two flanges are present comprising several holes, required for screws which fix the fixing element to a tube 30.

One flange 27 is used for fixing (supporting) the fixing element 29 to a tube 30, the other flange 28, opposing the first, being used to fix (support) the fixing element 29 to another adjacent tube 30 in line with the first tube 30. In this manner a continuous row of tubes 30 can be formed.

The horizontally positioned tube 30 can rotate about its own axis. To it there are connected a plurality of secondary tubes 31 fixed perpendicularly to the main tube 30 and able to rotate about their own axis by virtue of bearings.

A solar energy capitation panel 32 is fixed to each of the secondary tubes 31.

The main tube 30 is made preferably of extruded aluminium (reduced weight), is 12 m in length and is internally hollow with a diameter of about 30-40 cm.

The secondary tubes 31 terminate on both sides of the main tube with flanges enabling the panels 32 to be mounted by screws and demounted.

The main tube 30 is fixed at its ends to two support poles 11 maintained in position by a network of ties.

For two mutually aligned main tubes 30 two lateral support poles 11 and only one intermediate support pole 11 are required.

At one end of the main tube 30 a motor is provided, suitably fixed to the tube, its gearwheel engaging in a toothed semicircle (or toothed wheel) fixed to the fixing element 29. This motor rotates the main tube 30 about its axis.

More internally on the main tube 30 there is another motor driving a rack which rotates a pinion rigid with an axle fixed to the secondary tubes 31. This structure is repeated for each pair of secondary tubes fixed to a main tube 30.

As an alternative to the aforedescribed solution, the gearwheels can be replaced by a rack with pulleys and belts (or chains).

At another end of the main tube 30 a slidable expansion joint 33 is positioned, structured with telescopic elements to enable its expansion.

One telescopic element 34 is fixed to the flange of the electrical generator 29 and another telescopic element 35 is fixed to the main tube 30. The two telescopic elements are separated by a polytetrafluoroethylene (PTFE) ring 36. During assembly the slidable end is fixed to the support structure such as to enable maximum expansion and maximum contraction.

The expansion joint 33 enables the main tube 30 to lengthen by thermal expansion without bearing on the support points, which are the fixing elements or, vice versa, enable the fixing elements to have a certain elasticity of movement at the fixing points, compensating in this manner the elasticity of the cable.

As the main tube 30 is load-bearing, it supports its own weight, the weight of the internal linkages, the weight of the rotary shafts to which the panels are connected and the weight of the panels. The mechanical characteristics of the tube are such as to withstand wind forces and snow loads, independently of the position of the shafts.

The electrical connection cables for the various panels 32 and/or the turbines 17 are positioned inside the main tube 30, and carry away the current generated thereby.

The control system for the follower, integrated into the main tube 30, is able to constantly maintain the panels orientated towards the sun such that the sun is perpendicular to the captating surface of the panels, by known techniques deriving from the predictability of celestial mechanics, in accordance with an algorithm based on the date and time, the geographical installation coordinates and the orientation to north of the main axis parallel to the ground.

Each main tube 30 comprises a control system integrated into the tube itself, and a receiver/transmitter able to communicate with nearby main tubes 30.

The control system is provided with a receiver-transmitter preferably of ZigBee type by which it is able to communicate within a network consisting of several generators and one or more control centres. Each receiver-transmitter forms a node within the network able to communicate its own messages directly or to retransmit messages received from nearby nodes. The radius of action of the receiver-transmitter must be such as to be able to communicate not only with the closest receiver-transmitters but, in case of a fault in one or more of them, to be able to communicate with more distant receiver-transmitters. For this purpose, the radius of action of each receiver-transmitter will be equal at least to four times the length of the main tube 30.

A typical case could be the use of a structure combined with follower 32 and turbines 17, having main tubes 30 of length 12 m, in parallel rows spaced 12 m apart with poles of height 5 m comprising five panels on one side and five panels on the other side of the main tube 30 in positions opposite the first to avoid balancing problems, these being of size 1 m×2 m (or even greater), spaced about 1.5 m apart. With this configuration there are no limits to the type of crops or to the size of the agricultural machines able to pass below the plant.

By mounting the installation high, the generators and the electrical system are maintained far from the ground, so increasing the safety level for personnel and enabling floodable or marshy land to be used.

The structure with ties can be achieved with only limited foundation work by using micro-piles or posts to be inserted into the ground, hence avoiding the imposing reinforced concrete foundation work required by traditional trackers situated on the ground.

When a row of posts has been laid and the cable which connects the row of posts together transversely has been passed through the tops of the posts (the cable then being locked to the ground at the beginning and end of the row of posts), this solution enables the poles to be raised from the ground by rotating them very easily on the pivots at the base of the poles using a simple lever system. The joint between the pole and the foundation consists of a pivot which can be withdrawn to enable a pole to be replaced and which, at the end of the plant's life, enables the structure to be dismantled and the foundation easily removed from the ground. The foundation is coupled at the fixed ring at its end to a lifting system which withdraws it vertically from the ground.

The plant is balanced along all the movement axes and hence requires minimum force for its movement. This results in low energy consumption and lighter mechanical members.

The support structure of the present invention does not require reinforced concrete foundation work, which makes a considerable impact on the underlying ground and is difficult to remove at the end of the plant operating life. By virtue of the characteristics of the studied system, turbine installation is particularly simple and economical. It takes place completely on the ground, both in the case of a new structure installation, by virtue of the installation system based on hinging the base of the pole, which maintains the pole lying on the ground during installation, to be only afterwards placed in the erect position, and in the case of already existing structures in that said hinge enables the pole to be decoupled from the hinge by the amount necessary to be able to insert the fixing rings and the toroidal shaped components of the turbine. This aspect is fundamental in guaranteeing any maintenance operations for replacing said turbine components, operations which are economical as there is no need to demount the continuous tensostructure (so-called because it consists of continuous cables passing through the sockets positioned at the top of the poles).

As stated the pole does not have to withstand the enormous flexural stresses induced by the wind on the blade and transferred thereby onto the support post; consequently a normal pole of steel or even wood of small dimensions can be used.

Moreover the pole does not have to rotate but instead it is the turbine mounted on the pole itself which rotates, hence the pole is a very normal pole.

For very lengthy poles, such as in the present case of about 6 m, two or even three turbines can be mounted one above another on a pole using further fixing rings 9 or further bearings 18.

The materials used and the dimensions can be chosen at will according to requirements and to the state of the art.

The solar tracker conceived in this manner is susceptible to numerous modifications and variants, all falling within the scope of the inventive concept; moreover all details can be replaced by technically equivalent elements.

The invention claimed is:

1. A system for energy production from renewable sources comprising a support structure comprising:
    a first pole and a second pole which are positioned vertically;
    a first wind generator of vertical axis positioned on said first pole and a second wind generator of vertical axis positioned on said second pole;
    said first pole and said second pole each comprising a connection element positioned at their summit;
    said connection element comprising a lower portion to be fixed to said first pole and to said second pole;
    said connection element comprising an intermediate portion and an upper portion;
    a first seat for a first cable being positioned between said lower portion and said intermediate portion;
    a second seat for a second cable being positioned between said intermediate portion and said upper portion;
    said first cable and said second cable being substantially perpendicular;
    the ends of said first cable and of said second cable being fixed to the ground by a first post and a second post fixed into the ground;
    said first pole and said second pole being each anchored by a hinge to a third post fixed into the ground;
    each of said first and second wind generators having a longitudinal through hole to enable mounting on said first pole and on said second pole;
    each of said first and second wind generators comprising a lower first locking ring and an upper second locking ring, and a first bearing associated with said first ring and a second bearing associated with said second ring to enable said first and second wind generators to rotate,
    each of said lower first locking ring and said upper second locking ring having an adjustable fixing for enabling mounting of said wind generators vertically to said first and second pole.

2. A system as claimed in claim 1, characterised by comprising locking sleeves which are crimped onto said first cable and onto said second cable at predetermined distances, said first seat and said second seat being able to retain said locking sleeves.

3. A system as claimed in claim 1, characterised by comprising an electrical generator connected to said wind generator fixed coaxially to said first pole and to said second pole.

4. A system as claimed in claim 1, characterised by comprising a load-bearing horizontal main tube which can rotate about its axis; the ends of said main tube being coupled to the upper end of said first pole and of said second pole; a plurality of secondary tubes fixed in a movable manner perpendicular to the main tube and able to rotate about their own axis; a solar energy capitation panel being fixed to each of said secondary tubes.

5. A system as claimed in claim 1, characterised in that said hinge comprises a drilled plate fixed to each of said first pole and said second pole and a drilled plate fixed to said first or second post fixed into the ground; a pin being inserted through the holes of said drilled plates.

6. A system as claimed in claim 1, characterised in that said first pole and said second pole have a height greater than 3 m.

7. A system as claimed in claim 1, characterised in that said connection element comprises a first lateral portion for fixing a load-bearing horizontal main tube and a second lateral portion for fixing a possible further main tube.

8. A system as claimed in claim 7, characterised in that said load-bearing horzontal main tube comprises a slidable joint, which enables it to expand.

9. A system as claimed in claim 1, characterised in that said first locking ring and said second locking ring each comprise two half-flanges which are fixed to said first pole and to said second pole.

10. A system as claimed in claim 1, characterised in that said first pole and said second pole have a height greater than 4 m.

* * * * *